US012794965B2

(12) United States Patent
Hassan et al.

(10) Patent No.: US 12,794,965 B2
(45) Date of Patent: Nov. 10, 2026

(54) COMPUTING RESOURCE MANAGEMENT BASED ON DETERMINING A NUMBER OF DISCRETE USERS OF A SHARED COMMUNICATION CHANNEL

(71) Applicant: Microsoft Technology Licensing, LLC, Redmond, WA (US)

(72) Inventors: Amer Aref Hassan, Kirkland, WA (US); Roy David Kuntz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 18/770,443

(22) Filed: Jul. 11, 2024

(65) Prior Publication Data

US 2026/0019461 A1 Jan. 15, 2026

(51) Int. Cl.

| | |
|---|---|
| ***H04L 65/80*** | (2022.01) |
| ***A63F 13/335*** | (2014.01) |
| ***H04L 47/80*** | (2022.01) |
| ***H04L 65/1046*** | (2022.01) |
| ***H04L 65/1083*** | (2022.01) |
| ***H04L 65/403*** | (2022.01) |

(Continued)

(52) U.S. Cl.

CPC ............ *H04L 65/80* (2013.01); *A63F 13/335* (2014.09); *H04L 47/801* (2013.01); *H04L 65/1046* (2013.01); *H04L 65/1086* (2013.01); *H04L 65/403* (2013.01); *H04M 3/42314* (2013.01); *H04M 3/568* (2013.01); *H04M 7/1285* (2013.01); *H04M 2201/405* (2013.01)

(58) Field of Classification Search

CPC ... H04L 65/80; H04L 47/801; H04L 65/1046; H04L 65/1086; H04L 65/403; A63F 13/335; H04M 3/42314; H04M 3/568; H04M 7/1285; H04M 2201/405

See application file for complete search history.

(56) References Cited

U.S. PATENT DOCUMENTS 11,369,886 B2 * 6/2022 Nakamura ............ H04L 65/403
2016/0239904 A1 * 8/2016 Washington ........... G06Q 50/34

OTHER PUBLICATIONS

Karawani, Carl., "Microsoft Teams Shared Calling-Everything You Need to Know (2025 Edition)", Retrieved from: https://www.easy365.io/microsoft-teams-shared-calling-faq-6b3a6be69bcd/, Mar. 10, 2025, 13 pages.

(Continued)

*Primary Examiner* — Duc C Ho
(74) *Attorney, Agent, or Firm* — Klarquist Sparkman, LLP

(57) ABSTRACT

This present disclosure provides techniques and solutions for identifying a number of discrete users of a shared communication channel, such as share telephone line associated with a telephone number. Information about the number of discrete users can be used for adjusting computing resource capacity associated with the shared communication channel. A target speaker profile is generated for audio sent over the shared communication channel and compared with speaker profiles in a library. If the target speaker profile does not match any speaker profile in the library, the system increments the number of distinct users associated with the shared communication channel. Disclosed techniques can be applied to various shared communication channels, including shared telephone lines, network addresses, radio frequencies, network links, or network channels.

20 Claims, 6 Drawing Sheets

(51) Int. Cl.
*H04M 3/42* (2006.01)
*H04M 3/56* (2006.01)
*H04M 7/12* (2006.01)

(56) References Cited

OTHER PUBLICATIONS

"All You Need to Know About Microsoft Teams Shared Calling", accessed on URL: https://callroute.com/callroute/microsoft-teams-shared-calling/#:~:text=Shared%20Calling%20is%20the%20ability,PSTN%20voice%20services%20to%20Teams, Dec. 6, 2023, 19 pages.
Davenport, W.B., "A Study of Speech Probability Distributions", accessed on URL: https://core.ac.uk/download/pdf/4382144.pdf, Aug. 25, 1950, 82 pages.
Ganegedara, Thushan, "Intuitive Guide to Understanding KL Divergence", accessed on URL: https://towardsdatascience.com/light-on-math-machine-learning-intuitive-guide-to-understanding-kl-divergence-2b382ca2b2a8, May 1, 2018, 20 pages.

* cited by examiner

300

```
import numpy as np
from scipy.stats import entropy
import librosa

class ComputingSystem:
    def __init__(self):
        self.speaker_profiles = {}  # Library of speaker profiles
        self.distinct_users = 0  # Number of distinct users

    def receive_audio(self, audio_file):
        # Load the audio file
        audio, sr = librosa.load(audio_file)
        return audio

    def generate_speaker_profile(self, audio):
        # Calculate the amplitude quantization
        quantized_amplitude = np.histogram(audio, bins=100, density=True)[0]
        return quantized_amplitude

    def compare_profiles(self, target_profile):
        # Compare the target profile with the library of speaker profiles
        # Here we use the Kullback-Leibler divergence for comparison
        for speaker_id, profile in self.speaker_profiles.items():
            if entropy(target_profile, profile) < 0.01:  # This is a dummy threshold
                return speaker_id
        return None

    def increment_distinct_users(self):
        self.distinct_users += 1

    def identify_users(self, audio_file):
        audio = self.receive_audio(audio_file)
        target_profile = self.generate_speaker_profile(audio)
        matching_speaker = self.compare_profiles(target_profile)
        if matching_speaker is None:
            self.increment_distinct_users()
            self.speaker_profiles[self.distinct_users] = target_profile

# Usage
system = ComputingSystem()
audio_file = "dummy_audio_file.wav"  # This should be an actual audio file
system.identify_users(audio_file)
```

FIG. 3

COMPUTING RESOURCE MANAGEMENT BASED ON DETERMINING A NUMBER OF DISCRETE USERS OF A SHARED COMMUNICATION CHANNEL

FIELD

The present disclosure generally relates to analyzing audio data associated with communications over a shared communication channel. In particular, audio data can be analyzed to determine whether a speaker associated with the audio data represents a known speaker, or a speaker that has not been observed using a particular shared communication channel.

BACKGROUND

Shared communication channels, such as shared-line telephony systems, provide a flexible and cost-effective solution for businesses and organizations seeking efficient communication infrastructure. In the example of shared-line telephony systems, multiple users or endpoints share one or more phone lines (where a phone line refers to a shared phone number). The operation of shared-line systems typically involves the centralization of incoming and outgoing calls through one or more shared lines, managed by a private branch exchange (PBX) or similar telephony server. Users within the organization access this shared line to make and receive calls, using desk phones, softphones, or mobile devices connected to the system.

One of the primary reasons for adopting shared-line telephony systems is their ability to optimize resources and reduce infrastructure costs. By consolidating multiple users onto a shared phone line, organizations can minimize the number of physical phone lines required, leading to cost savings on equipment, installation, and maintenance. Additionally, shared-line systems offer flexibility in call management, allowing administrators to allocate and reassign phone lines dynamically based on changing organizational needs. This scalability is particularly advantageous for businesses experiencing fluctuations in call volume or staffing requirements.

Furthermore, shared-line telephony systems promote collaboration and efficiency within the workplace by facilitating communication among team members. Users can easily transfer calls to colleagues, participate in group calls, and access voicemail and other telephony features, enhancing productivity and workflow coordination. Moreover, shared-line systems support mobility and remote work, enabling users to connect to the system from any location with Internet access.

Despite these benefits, shared-line telephony systems may pose challenges in managing call traffic, including ensuring that the system has sufficient capacity for users. Administrators seek to implement effective call routing and prioritization strategies to prevent congestion and optimize call handling efficiency. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

For identifying a number of discrete users of a shared communication channel based on audio captured from the shared communication channel over multiple communication sessions. Audio is received over a communication session using the shared communication channel. A target speaker profile for the audio is generated. The target speaker profile comprises data for one or more speech characteristics of a speaker associated with the audio.

The target speaker profile is compared with one or more speaker profiles in a library of speaker profiles associated with the shared communication channel. Respective speaker profiles of the library of speaker profiles comprise data for the one or more speech characteristics. It is determined that the target speaker profile does not match a speaker profile in the library of speaker profiles associated with the shared communication channel.

A number of distinct users associated with the shared communication channel is incremented in response to determining that the target speaker profile does not match a speaker profile in the library of speaker profiles associated with the shared communication channel. Determining that the target speaker profile does not match a speaker profile in the library of speaker profiles is performed without solely using endpoint addresses of endpoints accessing the shared communication channel.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 3 provides example python code for determining whether a speaker associated with audio data matches a speaker in a library of speakers.

DETAILED DESCRIPTION

Example 1—Overview

Figure 1:
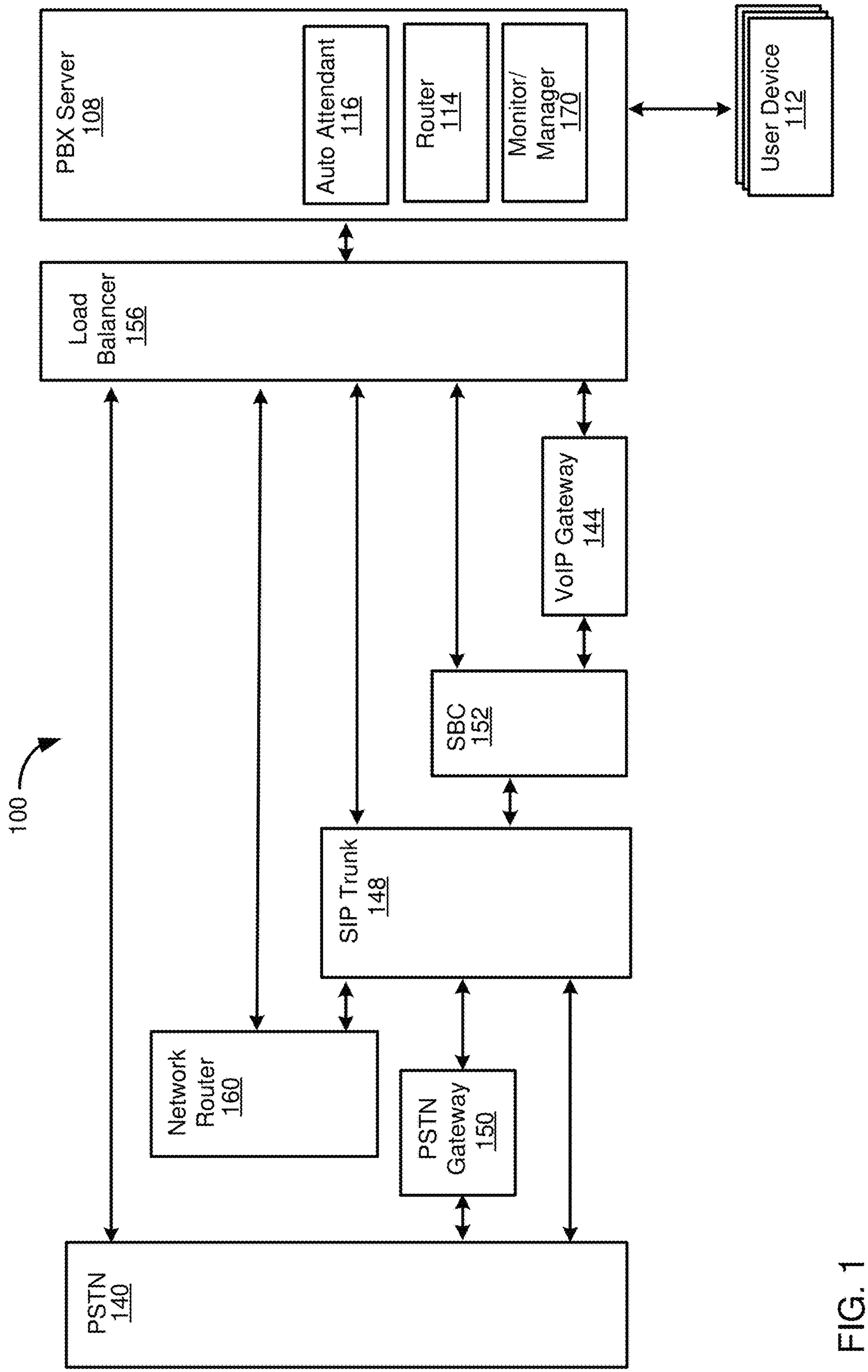
FIG. 1 is a diagram illustrating an example environment in which disclosed techniques can be implemented.

Shared communication channels, such as shared-line telephony systems, provide a flexible and cost-effective solution for businesses and organizations seeking efficient communication infrastructure. In the example of shared-line telephony systems, multiple users or endpoints share one or more phone lines (where a phone line refers to a shared phone number). The operation of shared-line systems typically involves the centralization of incoming and outgoing calls through one or more shared lines, managed by a private branch exchange (PBX) or similar telephony server. Users within the organization access this shared line to make and receive calls, using desk phones, softphones, or mobile devices connected to the system.

One of the primary reasons for adopting shared-line telephony systems is their ability to optimize resources and reduce infrastructure costs. By consolidating multiple users onto a shared phone line, organizations can minimize the number of physical phone lines required, leading to cost savings on equipment, installation, and maintenance. Additionally, shared-line systems offer flexibility in call management, allowing administrators to allocate and reassign phone lines dynamically based on changing organizational needs. This scalability is particularly advantageous for businesses experiencing fluctuations in call volume or staffing requirements.

Furthermore, shared-line telephony systems promote collaboration and efficiency within the workplace by facilitating communication among team members. Users can easily transfer calls to colleagues, participate in group calls, and access voicemail and other telephony features, enhancing productivity and workflow coordination. Moreover, shared-line systems support mobility and remote work, enabling users to connect to the system from any location with Internet access.

Despite these benefits, shared-line telephony systems may pose challenges in managing call traffic, including ensuring that the system has sufficient capacity for users. Administrators seek to implement effective call routing and prioritization strategies to prevent congestion and optimize call handling efficiency. Accordingly, room for improvement exists.

One issue that can arise with shared line systems is that it may be difficult to tell how many distinct users accessed a shared line over a particular time period. For example, a line may be configured to be shared by a hundred users, but in a given month only a fraction of that number may use the shared line. Usage can also be skewed among users, such as where some users do not use the shared line at all, some users use the shared line heavily, and where some users use the shared line occasionally.

In the context of shared-line telephony systems, operational information can be used in managing and identifying users accessing a shared phone line. This operational information can include endpoint addresses. An endpoint address refers to a unique identifier that is used to route data or calls to a specific destination in a communication network. This could be a phone number in a telephony system, an IP address in a computer network, a URL in a web service, or any other type of identifier depending on the specific communication system. The endpoint address serves as a "location" in the network where data or calls can be sent or received.

In the example of a shared-line telephony system, endpoint addresses can include caller IDs associated with incoming and outgoing calls, including as recorded in call detail records (CDRs) as well as call routing configurations. Caller IDs provide a way to associate specific calls with individual users or departments within an organization. However, caller IDs may not always directly correspond to individual employees, but can also represent departments or functional units, depending on the organization's setup. So, a single caller ID can be assigned to a functional unit with dozens or hundreds of users, and the operational information may not be useable to determine how many of those users accessed the shared line (either for outgoing or incoming calls).

It can be useful to track the number of discrete users of a shared phone line, including for capacity planning and adjustment, or in scenarios where billing for telephony services may be based on a number of distinct users accessing a shared line. That is, as the number of discrete users increases, it may be desirable to allocate additional telephone circuits, servers, network bandwidth etc. to be able to handle a call volume, including as a number of concurrent calls may increase as the number of distinct users increases. Because of the issues noted above, it may be difficult to track a number of distinct users of a shared phone line using operational information of the shared line system.

The present disclosure addresses these issues by using audio data from the shared-line system to determine a number of distinct users. For audio of a call on a line of the shared line system, various descriptors of a voice or vocal patterns of a speaker can be generated and maintained in a speaker profile. When an audio sample is to be analyzed to determine whether the speaker in the audio system is a known speaker or a new speaker, a target speaker profile for a speaker in the audio sample can be generated based on the audio sample. The target speaker profile is compared with one or more speaker profiles in a library. If the target speaker profile matches a speaker profile in the library, it can be determined that the associated call was made by a known speaker, and does not represent another distinct speaker.

Conversely, if the target speaker profile does not match any speaker profile in the library, it can be determined that the speaker associated with the target speaker profile represents an additional distinct speaker, and a number of distinct speakers associated with the shared line can be incremented. Speaker profile information for the new speaker can be added to the library for use when further audio data is processed. That is, the previously unknown speaker becomes a known speaker.

Example 2—Example Technical Advantages

Disclosed techniques can thus provide a variety of technical advantages. By analyzing audio sent over a shared phone line, a number of distinct users of the shared phone line can be more accurately determined, which can help ensure that sufficient resources are provided to process telephone calls. Adjusting resources can include adding resources as a number of distinct users increases, and can also include reducing resources if the number of distinct users decreases. Disclosed techniques can allow for more pro-active resource management, so that, as the number of distinct users increases, additional resources can be added before the performance of the telephone system is negatively impacted by increased use.

In some implementations, disclosed techniques can calculate speaker characteristics information that are comparatively computationally efficient, which can be particularly useful as the size of a speaker library grows, or where real time or near-real time analysis is desired. Disclosed techniques also help provide data privacy and security. That is, for the purposes of disclosed techniques, it desired whether to know whether a target speaker profile matches a known profile, but it is not necessary to associate any speaker profile with a particular individual.

Computing resource use can be further reduced by controlling how comparisons between the target speaker profile and the speaker profiles in the library are made. For example, information can be maintained on how frequently particular speakers in the speaker library used the shared phone line. When a target speaker profile is analyzed, it can be compared against speaker profiles in order of decreasing frequency. Since a comparison process can end once/if a match in the library is identified, this technique can reduce the number of comparisons needed before a match is identified. Other types of probabilistic adjustments can be used, such as using context information for calls, such as a time of day, day of the week, or call duration associated with a call for the target speaker profile to identify the most probable candidates in the library, which can be evaluated before less probable candidates.

While disclosed techniques are described in the specific example of a shared-line telephony system, where multiple users can currently access the same phone number, they can be implemented in other types of shared communication channels. In the context of the present disclosure, a shared communication channel is capable of having multiple users concurrently using the shared communication channel, where there is an identifier for the shared communication channel that is also shared by the concurrent users (as with the shared telephone number in a shared-line telephony system). Other examples of shared communication channels can include network communications (where multiple users might share a network address), or shared radio frequencies or similar communication channels. Further examples of shared communication channels can include virtual meeting platforms (associated with a virtual meeting platform and a meeting ID) and online multiplayer games (associated with a game server address), where multiple users can concurrently join a meeting or a game via a shared link or channel.

The use of disclosed techniques in meetings can provide similar advantages as with their application in shared-line telephony systems. For example, a conference room can be a “participant” on a call, but there may be multiple speakers in the conference room. Simply counting the number of “users”/connections for a conference may not accurately reflect the number of actual participants.

Example 3—Example Telephony Environment

FIG. 1 illustrates a telephony environment 100 in which disclosed techniques can be implemented. The environment 100 includes a private branch exchange (PBX) server 108 that communicates with a plurality of user devices 112. The PBX server 108 performs operations to manage and route calls, which can be external or internal calls, within an organization. As discussed in Example 1, the PBX sever 108 allows a single phone line to be shared by many users.

The PBX server 108 routes calls using address management and packet switching technologies, such as using a router 114. Each user device 112 connected to the PBX server 108 is assigned a unique identifier or address, such as an extension number for internal routing or an IP address for VoIP devices. As discussed in example 1, pools of user devices 112 can also be assigned identifiers, such as where an incoming call is routed to the device pool, and can be picked up by any of multiple user devices.

In the context of the PBX server 108, “user device” refers to a variety of communication endpoints that connect to the PBX server to facilitate voice and data communications within an organization. The user devices 112 can be used to both make and receive calls, as well as accessing other telecommunication services provided by the PBX server 108 system. User devices 112 include digital telephones that use Internet Protocol (IP) to communicate over the internal network and the Internet, commonly referred to as IP phones. These devices connect directly to the PBX server 108 via the organization’s network infrastructure, providing voice communication and access to PBX features such as voicemail, call forwarding, and conferencing.

User devices 112 can also be traditional analog telephones that use analog signals to transmit voice data. When connected to the PBX server 108, analog phones typically use an analog telephone adapter (ATA) to convert analog signals into digital packets that can be routed through the PBX server. Another category of user devices 112 includes softphones, which are software-based telephones running on personal computers, laptops, or mobile devices. These softphones use VoIP technology to connect to the PBX server 108 over the network, offering the same functionalities as physical IP phones. Example of softphones include those using X-LITE or 3CX SOFTPHONE.

Smartphones and tablets, when equipped with appropriate applications or software, can be user devices 112. These mobile devices can connect to the PBX server 108 via Wi-Fi or mobile data networks, functioning as full-featured telephones capable of making and receiving calls, accessing voicemail, and utilizing other PBX services. Similarly, smart watches, as wearable devices, can be configured to interact with the PBX system for basic telephony services, receiving call notifications, displaying caller information, and facilitating voice communication through built-in microphones and speakers. The smartphones, tablets, watches or other types of smart devices can also access the PBX server 108 using suitable software applications, such as SKYPE, ZOOM, or MICROSOFT TEAMS.

Furthermore, personal computing devices such as computers and laptops, with the appropriate software, such as versions of the software described for smartphones and tablets, can interface with the PBX server 108 for voice and video communications. These devices can host softphones or other communication applications that leverage the PBX infrastructure. Dedicated communication devices, which are specialized hardware designed for specific communication purposes, such as conference phones, intercom systems, and paging devices, can also serve as user devices 112 and connect to the PBX server 108 and provide enhanced functionalities tailored to particular use cases within the organization.

User devices 112 can communicate with the PBX server 108 using various protocols and technologies, such as session initiation protocol (SIP) for VoIP communications. Each user device 112 is assigned a unique identifier, such as an extension number or IP address, which the PBX server 108 uses to route calls and manage communications.

When an incoming call arrives, the PBX server 108 uses these identifiers to determine the correct destination for the call. The PBX server 108 consults its directory of user devices 112 and applies predefined rules and configurations to match the call with the appropriate endpoint. This process may involve consulting an auto-attendant 116 of the PBX server 108, which presents callers with a menu of options to route their calls to the desired department or individual. Once the destination is identified, the PBX server 108 encapsulates the voice data into packets and transmits them over an internal network to the specified user device 112.

To facilitate the use of a single phone line by multiple users, the PBX server 108 can employ various call distribution strategies, such as hunt groups and call queues. Hunt groups allow the PBX server 108 to sequentially or simultaneously ring a predefined group of user devices 112 until the call is answered. This is particularly useful in environments where multiple users are responsible for handling incoming calls, as it ensures that calls are answered promptly. Call queues, on the other hand, place incoming calls in a waiting line and distribute them to the next available user device 112 based on the order of arrival.

The PBX server 108 also facilitates concurrent use of the same phone line by multiple user devices 112 for outgoing calls. This is achieved through a process known as trunking, where multiple communication channels are multiplexed over a single physical line or IP connection. The PBX server 108 manages these channels and dynamically allocates them to user devices 112 as needed, allowing multiple outgoing calls to be placed simultaneously without conflict. Each outgoing call is assigned a separate channel, and the PBX server 108 encapsulates the voice data into packets, directing them to the appropriate external destination based on the dialed number. This ensures that all users can make outgoing calls independently, even when sharing the same phone line.

Before forwarding the packets for external transmission, the PBX server 108 may perform additional processing, including modifying packet headers to ensure proper routing, applying quality of service (QOS) policies to prioritize voice packets, encrypting voice packets for secure transmission, compressing voice packets to optimize network performance, and applying other optimizations to enhance voice transmission efficiency and quality. In some cases, user devices 112 can send analog signals to the PBX server 108, which can digitize and process the digitized signals as described above.

In telecommunications systems, particularly in scenarios where businesses or organizations are allocated multiple phone lines, where each phone line may be accessed by many users, techniques are employed to manage call traffic efficiently and distribute processing load across these lines. One such technique involves call forwarding with call metadata management. Call forwarding enables incoming calls to be redirected from one phone line to another, allowing for distribution of incoming call traffic or redirection based on predefined criteria.

The call metadata management aspect of this technique involves manipulating call signaling information to ensure that forwarded calls appear to originate from the originally specified phone line, despite being routed through a different line or destination. Load balancing can be achieved by using call forwarding across multiple phone lines, evenly distributing the processing load across available resources. Additionally, call forwarding serves as a redundancy mechanism, ensuring continuous communication in the event of line failures or disruptions.

Call forwarding with call metadata management is typically orchestrated by the PBX server 108. Acting as the central hub for call management, the PBX server 108 evaluates predefined call forwarding rules or configurations to determine the need for call redirection. Upon identifying a forwarded call, the PBX server 108 modifies call signaling information to reflect the appearance of the call as originating from the originally specified phone line. This manipulation ensures seamless caller experiences for both callers and recipients. Furthermore, the PBX server manages the routing of the call to the appropriate destination within the organization's network.

The PBX (Private Branch Exchange) server 108 interfaces with the public switched telephone network (PSTN) 140 to manage incoming and outgoing communications for an organization. In many scenarios, the primary interface between the PBX server 108 and the PSTN 140 is a VoIP (Voice over Internet Protocol) Gateway 144, which acts as a bridge by converting analog voice signals from the PSTN into digital packets that can be processed by the PBX server 108. Conversely, the VoIP Gateway 144 converts digital signals from the PBX server 108 into analog signals for outgoing calls over the PSTN 140.

A SIP (Session Initiation Protocol) trunk 148 connects the PBX server 108 to the Internet, enabling VoIP communications. The SIP trunk 148 allows the PBX server 108 to send and receive calls over the Internet, providing an additional pathway for managing external communications. The SIP trunk 148 handles the initiation, modification, and termination of sessions, such as voice or video calls.

A PSTN gateway 150 can provide a link between the SIP trunk 148 and the PSTN 140. Acting as an intermediary, the PSTN gateway 150 facilitates the conversion of SIP-based calls to the signaling protocols used by the PSTN 140 and vice versa. This conversion enables seamless communication between the PBX server 108, which operates on VoIP technology, and the external PSTN network 140.

A session border controller (SBC) 152 can be positioned to manage and secure VoIP traffic, helping to ensure quality of service and protecting the network from potential security threats. The SBC 152 controls session initiation, termination, and management, maintaining the integrity and reliability of VOIP communications. It acts as a firewall for VOIP traffic, monitoring and controlling data streams to prevent unauthorized access and mitigate threats such as denial-of-service attacks. In this setup, the SBC 152 helps ensure that VoIP traffic remains secure and of high quality before it reaches the PBX server 108 or is sent out through the SIP trunk 148.

To distribute incoming call traffic efficiently, a load balancer 156 can be deployed between the incoming communication sources and the PBX server 108. The load balancer 156 helps avoid a single PBX server 108 becoming a bottleneck, enhancing overall system performance by dynamically allocating resources based on real-time demand. It can distribute incoming calls across multiple PBX servers 108. The load balancer 156 can help maintain high availability and reliability by redirecting traffic to available PBX servers 108, thus preventing overload and potential downtime.

A network router 160 manages network traffic between the PBX server 108 and an external network. It facilitates connections between the PBX server 108 and other network components, such as user devices and network switches. The router 160 directs packets to their correct destinations within the network and to external networks.

The components of the environment 100 can be used in a variety of implementation scenarios. For example, in one implementation, the PSTN 140 can connect directly to the VoIP gateway 144, which then routes the digital packets to the PBX server 108. Alternatively, the PSTN 140 can connect directly to the SIP trunk 148, bypassing the VoIP gateway 144 and allowing the PBX server 108 to handle calls over the Internet using VoIP protocols. The PSTN 140 may also connect to the VoIP gateway 144, which then routes the traffic to the load balancer 156, distributing the calls across multiple PBX servers 108. Another configuration involves the PSTN 140 connecting to the SIP trunk 148, which then routes the traffic to the load balancer 156.

In some scenarios, the PSTN 140 connects to the SBC 152 first, which then routes the traffic either to the VOIP Gateway 144 or the SIP trunk 148 before reaching the PBX server 108. The SBC 152 ensures security and quality of service before the signals are processed by the PBX server 108. The PSTN 140 may also connect directly to the load balancer 156, bypassing other components and distributing the traffic to multiple PBX servers 108.

In another scenario, the PSTN 140 may connect directly to the SBC 152, acting as the initial point of contact for incoming traffic. From the SBC 152, the traffic can be selectively routed either to the VoIP Gateway 144 or the SIP trunk 148 before reaching the PBX server 108. This intermediate routing through the SBC 152 helps ensure stringent security measures and stringent quality of service policies are applied before the signals are processed by the PBX server 108.

Alternatively, in scenarios where direct integration with the PSTN gateway 150 is not required, the PSTN 140 may first connect to the SBC 152. From there, the SBC 152 routes the traffic either to the VOIP Gateway 144 or the SIP trunk 148 before reaching the PBX server 108. In this configuration, the PSTN gateway 150 is bypassed, and the SBC 152 serves as the initial point of contact for incoming traffic from the traditional telephone network.

Resources of the environment 100 can be adjusted in response to fluctuating user demand or evolving operational requirements. These adjustments can involve various components and configurations, facilitating the scaling up or down of capacity as appropriate in view of dynamic usage patterns. For example, if a count of unique users increases, capacity can be increased proactively to make sure there are sufficient resources available so that the PBX server 108 can complete incoming and outgoing calls, and avoid system crashes due to insufficient resource. In a similar manner, resources can be reduced if a user count decreases.

Within the PBX server 108, user profile configurations can be adjusted to accommodate changes in user numbers, with extensions added or removed as needed. Call routing rules and configurations can also be fine-tuned to optimize call distribution.

Regarding the VoIP gateway 144 or the PSTN interface 150, the system's capacity can be augmented or reduced by scaling the number of VoIP gateways 144 or PSTN interfaces 150. The capacity of SIP trunks 148 can be dynamically managed by adjusting bandwidth allocations to support higher call concurrency or conserve bandwidth during off-peak periods. Additionally, the addition or removal of SIP trunk channels 148 enables the system to adapt to changing call volume requirements efficiently.

In a similar way, resources of the SBC 152 can be scaled up to handle increased VoIP traffic volumes or reinforce security measures as a number of unique users increases. Configuration adjustments within the SBC 152 enable the prioritization of specific traffic types or the implementation of traffic shaping policies for optimized bandwidth utilization.

Optimization of the load balancer 156 can involve dynamically adjusting settings to evenly distribute incoming call traffic across multiple PBX servers 108 based on real-time demand. The configuration of the network router 160 can be adjusted, such as to prioritize voice traffic over data traffic and ensure low-latency communication.

Management of the resources as described above can be performed by a monitoring/management component 170 of the PBX server 108, using information about a number of discrete callers determined using disclosed techniques.

Figure 2:
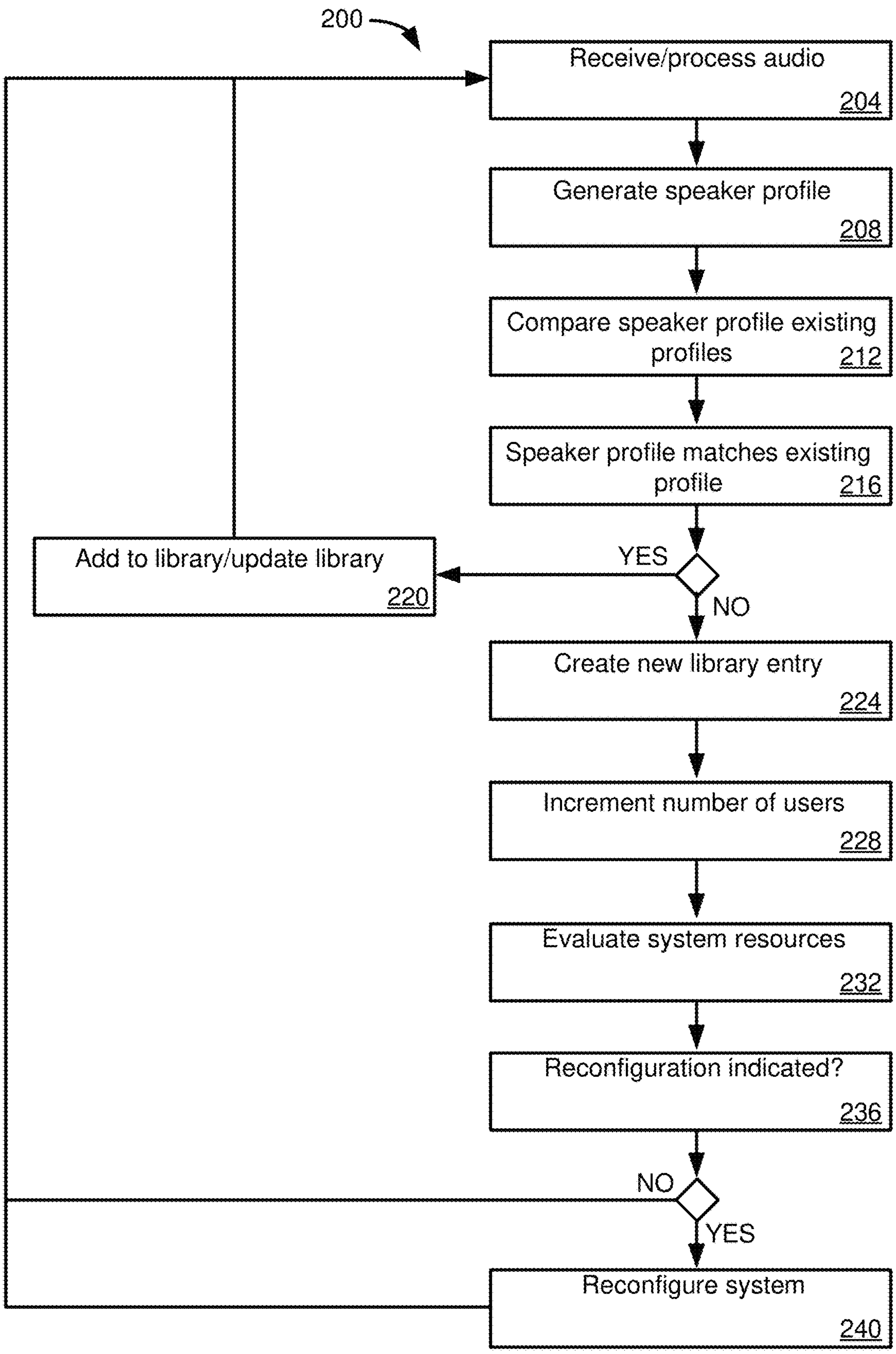
FIG. 2 is a flowchart of a process of evaluating audio to determine whether a speaker associated with the audio has previously been observed using a telephone line.

Example 4—Example Calculation of Target Speaker Profile and Comparison with Speaker Profile Library FIG. 2 is a flowchart of a process 200 for analyzing audio data to determine whether a speaker associated with the audio data matches a profiled speaker or represents a new speaker. Audio is received, and optionally processed, at 204. The audio can be in any suitable format, including as analog signals or digitized signals.

Intercepting and capturing audio within a PBX system, such one having the PBX server 108 of FIG. 1, can involve configuring the system to monitor or record voice communications as they pass through the network. A PBX system can include features for call monitoring, recording, or logging, accessible through the PBX management interface or configuration files.

In one approach, call monitoring is used, which allows the PBX system to listen in on active calls without interfering with the conversation. This feature permits authorized users, or for the purpose of the disclosed technologies, authorized computing processes, to obtain call audio for use in speaker profiling. Call monitoring can be particularly useful when real time or near-real time profiling or analysis is desired.

Alternatively, call recording can be used, where the PBX system actively captures and stores audio data from voice communications. Configuration options allow for the automatic recording of all calls, specific types of calls (e.g., inbound, outbound, internal), or calls to/from certain extensions or departments. Call recording can be particularly useful when real time analysis is not needed.

In further scenarios, a PBX system can integrate with third-party call recording solutions or hardware devices designed for capturing audio. These solutions can often offer features like centralized management, encryption, compliance logging, and integration with CRM or analytics platforms.

Once captured, audio recordings can be stored in designated locations within the PBX system or on external storage devices. Retention policies can be implemented to manage storage space and automatically purge old recordings after a specified period. Authorized computing processes can access recordings through the PBX management interface or dedicated recording playback applications.

As another option, audio may be captured at a user device, such as a user device 112 of FIG. 1. This recording can include configuring individual devices, such as IP phones or softphones, to record audio locally. Captured audio may be stored on the device itself or transmitted to the PBX system for centralized storage and management.

To help ensure the confidentiality and integrity of recorded audio, PBX systems may support encryption mechanisms to protect recordings from unauthorized access or tampering. Access controls, user authentication, and audit trails help maintain security and compliance with data privacy regulations. Further, as will be further described, at least some techniques do not specifically associate particular audio with a particular individual. That is, in some implementations, it may be of interest how many unique users have accessed a phone line, including within a time period, but the identity of the speaker may not be important. This is true even when the same speaker uses the phone line multiple times and it is desirable to track this information—disclosed techniques can use this information for a variety of purposes, including for audio comparison logic—but where it is not necessary to know the identity of the speaker.

Audio data captured within a PBX system for automated analysis by computing processes is typically stored in digital formats optimized for efficient processing and analysis. Commonly used formats include WAV (Waveform Audio File Format), FLAC (Free Lossless Audio Codec), MP3, OGG (Ogg Vorbis), Opus, or similar audio formats. PBX systems designed for automated analysis can provide options for configuring the preferred audio format for recording, taking into account factors such as storage constraints, processing capabilities, and the nature of the analysis tasks to be performed. For example, a format and recording quality may be selected to help ensure that speaker profile data is of sufficient quality for use in disclosed processes.

Depending on how audio is captured, additional processes may be used to isolate audio information of a particular speaker. If audio interception occurs at the PBX server level, audio data from all users within the system, both internal and external, is typically routed through the PBX server, allowing for centralized capture and processing. The PBX server can then apply techniques such as packet inspection or protocol analysis to extract audio data associated with the desired speaker. For instance, if session initiation protocol is used for VOIP communications, the PBX server can analyze SIP headers to identify and segregate audio streams corresponding to specific users.

Alternatively, when audio is captured at the user device level, each device is responsible for capturing and transmitting its own audio data to the PBX server. In this case, techniques for isolating the desired speaker's audio may be applied either before or after transmission to the PBX server. For example, if the user device supports local processing capabilities, such as voice activity detection (VAD) or speaker recognition, these techniques can be used to identify and extract audio segments corresponding to the desired speaker before transmission. Alternatively, the PBX server can receive the raw audio data from the user devices and apply post-processing techniques, such as signal processing algorithms or machine learning models, to isolate the desired speaker's voice from the overall audio stream.

Post-processing techniques can involve analyzing audio features such as speech patterns, cadence, or spectral characteristics to identify segments corresponding to the desired speaker. Techniques for isolating the desired speaker's voice from the overall audio stream at the PBX server include voice activity detection (VAD), speaker diarization, adaptive filtering, and deep learning models.

Voice activity detection (VAD) algorithms analyze audio signals to detect periods of speech activity and silence. By segmenting the audio stream into speech and non-speech segments, VAD can help isolate the desired speaker's voice from background noise or other speakers.

Speaker diarization techniques partition audio recordings into segments corresponding to individual speakers. By clustering audio segments based on speaker characteristics such as voice timbre or speaking patterns, speaker diarization algorithms can separate the desired speaker's voice from other speakers in the audio stream.

Adaptive Filtering techniques remove unwanted noise or interference from audio recordings, enhancing the clarity of the desired speaker's voice. By adaptively adjusting filter parameters based on the characteristics of the input audio signal, adaptive filtering algorithms can suppress background noise or echoes while preserving the desired speaker's voice.

Deep learning models, such as convolutional neural networks (CNNs) or recurrent neural networks (RNNs), can be trained to recognize and extract features specific to the desired speaker's voice. By leveraging large datasets of labeled audio recordings, deep learning models can learn complex patterns and relationships within the audio data, enabling accurate isolation of the desired speaker's voice from the overall audio stream.

These techniques can be applied individually or in combination to effectively isolate the desired speaker's voice from the overall audio stream, enabling targeted analysis and processing of audio data within PBX systems. Information about whether the call is an incoming or outgoing call can also be used to assist in voice isolation and extraction. For example, typically the person who is called would be the first recorded voice. The caller might be the second recorded voice, and in many cases would speak for a longer period of time after the call was initially answered by the recipient.

A speaker profile is generated at 208. The speaker profile reflects characteristics of the speaker's voice or speaking pattern that can be used to identify the speaker as corresponding to a speaker in particular audio data and distinguish the speaker from other speakers.

A speaker profile can include one or more types of data that can be used to characterize a speaker's voice or voice pattern. Speaker voice characteristics encompass a range of acoustic features that contribute to the uniqueness of an individual's speech or speech patterns. These characteristics include, but are not limited to, pitch, intonation, speech rate, amplitude modulation, spectral characteristics, and temporal patterns.

Pitch refers to the perceived frequency of a speaker's voice, which can vary based on physiological factors such as vocal cord tension and length. Intonation relates to the variations in pitch across an utterance, conveying nuances of meaning and emotion.

Speech rate, or tempo, refers to the speed at which speech is produced and can vary significantly between speakers due to factors such as linguistic background, speaking style, and emotional state. Amplitude modulation reflects changes in the intensity or loudness of speech over time, which can convey emphasis, emotion, and prosodic cues.

Spectral characteristics describe the distribution of energy across different frequency bands in the speech signal, which can be influenced by vocal tract shape and size, as well as articulatory dynamics. Temporal patterns encompass aspects such as pauses, speech rhythm, and timing of articulatory events, which contribute to the overall rhythm and fluency of speech.

In longer conversation samples, these speech characteristics can manifest in a more pronounced or differentiated manner. For example, prolonged pauses or hesitations may reveal unique patterns of speech pacing or hesitancy, while variations in amplitude modulation can convey changes in emotional state or emphasis. Moreover, the interaction between these characteristics within the context of a conversation can further contribute to speaker distinctiveness. For instance, the combination of pitch inflections, speech rate variations, and spectral characteristics during conversational turn-taking can create a unique vocal fingerprint for each speaker.

Implementations of disclosed techniques can be selected to look at one or more of these characteristics in establishing a speaker profile. Similarly, the duration of speech audio to be analyzed can be adjusted, such as to balance accuracy/precision with considerations such as computational expense or privacy.

Amplitude quantization is a technique used in speaker profiling to characterize the distribution of amplitude levels in speech signals. In this method, the continuous amplitude values of the speech signal are discretized into a finite number of levels or bins. This discretization process reduces the complexity of the signal representation while retaining essential information about the signal's amplitude characteristics.

To implement amplitude quantization, the range of amplitude values in the speech signal is divided into intervals, and each interval is assigned a discrete amplitude level. The number of intervals, or quantization levels, can vary depending on the desired resolution of the quantized representation.

For example, a low-resolution quantization may use fewer levels, while a high-resolution quantization may use more levels to capture finer details of the amplitude distribution.

Once the speech signal has been quantized, a histogram or probability density function is constructed to represent the distribution of quantized amplitude levels. This histogram provides a statistical description of the amplitude characteristics of the speech signal, including information about the distribution of loudness levels and the dynamic range of the signal.

The resulting amplitude quantization profile serves as a compact representation of the speech signal's amplitude properties, which can be used for speaker profiling purposes. By comparing the amplitude quantization profiles of different speakers, it is possible to discern distinctive patterns or characteristics in their speech amplitude distributions. These patterns may include differences in overall loudness, variations in speech dynamics, or unique amplitude modulation patterns associated with individual speakers.

When comparing probability density functions (PDFs) generated from speaker profiles, various techniques can be employed to assess the similarity or dissimilarity between them. One commonly used measure is the Kullback-Leibler (KL) divergence, a statistical method that quantifies the difference between two probability distributions.

The KL divergence measures how one PDF diverges from another by calculating the information lost when the first distribution is used to approximate the second. It provides a numerical value representing the discrepancy between the two distributions, with smaller values indicating greater similarity.

The KL divergence between the probability density functions f, of two callers $C_1$ and $C_2$ can be calculated as:

$$KL = \sum_{x \in X} f(C_1, x) \log \frac{f(C_1, x)}{f(C_2, x)}$$

In the above equation, x represents amplitude quantization of speech. KL is an indicator of how distant the two functions are:

If $KL<\eta$ (some threshold optimizing for probability of error), then $C_1$ and $C_2$ are calls that are with high probability made by the same user.

If $KL>\eta$, then a new user is assigned to this distribution

Another technique for comparing PDFs is based on zero-crossings, which are points where a function changes sign. In the context of speaker profiles, zero-crossings can be used to identify abrupt changes or transitions in the probability density function, which may correspond to distinct features of a speaker's voice. By analyzing the distribution of zero-crossings and comparing them between PDFs, it is possible to assess the similarity of speaker profiles. Other techniques can be used, such as such as Euclidean distance or cosine similarity.

Pitch analysis can be used to establish a speaker profile. Pitch analysis involves analyzing the fundamental frequency of a speaker's voice, which corresponds to the perceived pitch. By examining pitch patterns, variations, and contours within speech samples, unique features of a speaker's voice can be identified and quantified.

The fundamental frequency (F0) can be extracted from the speech signal using signal processing techniques such as autocorrelation or cepstral analysis. Once the fundamental frequency is obtained, it can be analyzed to extract relevant pitch-related features. For example, statistical measures such as the mean, median, standard deviation, or range of pitch values over a speech sample can be calculated.

Additionally, pitch contours can be analyzed to capture intonation patterns and pitch fluctuations throughout speech segments. By examining the shape, direction, and timing of pitch contours, distinctive prosodic features such as rising or falling intonation, emphasis, or emotional expression can be identified. Further, techniques such as pitch modulation analysis can be used to analyze pitch changes over time. Pitch modulation analysis can include analyzing the rate and magnitude of pitch variations, as well as identifying pitch transitions and inflection points within speech segments.

A variety of other techniques can be used in generating speaker profiles and in comparing speaker profiles. Formant analysis can be used, which involves identifying the resonant frequencies of the vocal tract from speech signals. Capturing these formant frequencies and their dynamics can help distinguish speakers based on the distinct patterns of formant frequencies present in their speech.

Mel-frequency cepstral coefficients (MFCCs) can be used to capture spectral features that can be used to differentiate different speakers. Linear predictive coding (LPC) can be used to model the spectral envelope of speech signals by estimating the coefficients of a linear prediction filter. This technique is useful in speaker profiling/comparison, as it captures vocal tract characteristics such as resonance frequencies and formant structures. By analyzing LPC coefficients, differences in vocal tract shapes and sizes among speakers can be identified and used for speaker comparison.

A spectral centroid technique can be used, where the spectral centroid represents the "center of mass" of the frequency distribution in speech signals. Variations in spectral centroid values among speakers can indicate differences in vocal tract shapes and speech production mechanisms.

Spectral bandwidth refers to the spread of frequencies in speech signals. By calculating spectral bandwidth, information about the distribution of spectral energy across different frequency bands can be obtained. In speaker profiling, differences in spectral bandwidth can reflect variations in vocal tract shapes and sizes among speakers, aiding in speaker differentiation. Relatedly, spectral roll-off points indicate the frequency at which a certain percentage of the total spectral energy is concentrated. By determining spectral roll-off points, insights into the high-frequency content of speech signals can be obtained. Variations in spectral roll-off points can be used to help distinguish one speaker from another.

Entropy measurements can also be used to establish speaker profiles. Energy entropy measures the uniformity of energy distribution in speech signals. By computing energy entropy, the complexity or predictability of a speaker's voice can be measured.

Voiced/unvoiced detection also can be used in a speaker profile. These properties discriminate between speech segments with vocal cord vibration (voiced) and without (unvoiced). The properties can reflect differences in speaking styles and articulation patterns between speakers.

A speaker profile can include the results of a duration analysis, where a duration analysis examines the temporal characteristics of speech segments, offering insights into the pacing, rhythm, and articulation patterns of speech. The analysis can include determining the durations of various speech segments, such as phonemes, syllables, words, or utterances, which reflect differences in speaking styles and articulation among speakers. This technique captures variations in the tempo and rhythm of speech delivery.

Disclosed techniques are not limited to these techniques, and techniques such as artificial intelligence or machine learning may be used to establish speaker profiles. In some cases, the speaker profile can be, or include, recorded audio, and recorded audio for two speakers can be provided to a machine learning model to provide a result that indicates a likelihood that the two speakers are or are not the same.

At 212, the generated speaker profile is compared with existing speaker profiles. Comparison of probability density functions for amplitude quantization was discussed above. In general, speaker profiles can be compared using statistical measures or algorithms that quantify the degree of resemblance between the extracted features or characteristics of the speakers' voices.

For techniques such as formant analysis, mel-frequency cepstral coefficients (MFCCs), linear predictive coding (LPC), and spectral analysis (including measures like spectral centroid, spectral bandwidth, spectral roll-off, and energy entropy), comparison typically involves computing the similarity between the feature vectors representing the speakers' profiles. This can be achieved using distance metrics such as Euclidean distance, Manhattan distance, or cosine similarity. These metrics quantify the dissimilarity between feature vectors, with smaller distances indicating greater similarity between speakers and vice versa. Similarly, techniques like pitch analysis, zero-crossing rate analysis, and voicing detection involve extracting specific voice attributes or characteristics from the speech signal and comparing them between speaker profiles.

Machine learning algorithms, such as k-nearest neighbors (k-NN), support vector machines (SVM), or neural networks, can also be trained to classify or cluster speaker profiles based on their extracted features. These algorithms learn patterns from labeled training data and can subsequently classify or compare unseen speaker profiles based on their learned representations.

When the process 200 is initially started, the library of speaker profiles may be empty. So, the first audio sample processed will result in a new library entry. For the second audio sample, a single pair-wise comparison can be made between the audio sample and the existing speaker profile. As more speaker profiles are added to the library, a series of pairwise comparisons can be made between a target speaker profile generated from the audio sample and the speaker profiles in the library. Typically, the pairwise comparisons are made until it is determined that the audio sample matches a speaker profile in the library or all profiles in the library were compared and no match was identified.

As the number of speaker profiles in the library increases, and in some cases a library can have hundreds or even thousands, of speakers, it can be time consuming and computationally expensive to compare an audio sample with many speaker profiles in the library. According, speaker profiles can be evaluated using probabilistic weighting, such as where the profiles are ordered, ranked, or otherwise associated with information that indicates a priority in which speaker profiles should be evaluated.

In a particular example, it is tracked how often a particular speaker was observed in audio samples obtained over a time period. For example, one user may be associated with a single call in a given month, while another user may be associated with hundreds of calls. In one implementation, the speaker profiles in the library are analyzed in order of decreasing frequency. In this way, the comparison process is more likely to terminate sooner than if the speaker profiles were compared in a random order, an order in which they were added to the library, etc.

In some cases, this kind of ordering/priority information can be redetermined periodically. For example, at the end of a month, speaker frequency can be determined and new priority information can be used for the upcoming month in place of priority information from the preceding month. In other cases, priority information can be static, or can be adjusted in other ways, such as using a decay function, where older profile information/profile instances/observances are given less weight (or are removed from consideration).

In another example, dynamic updating or online learning techniques can be used. For example, rather than adjusting priorities according to a period or schedule, the frequencies can be updated as audio samples are evaluated, such as determining a percentage of an overall number of calls that are attributable to a particular speaker profile, where, again, this information can be subject to a decay function.

Contextual information, such as a time or day of a call or call duration can be maintained as part of a speaker profile, and used in determining speaker profiles in the library to prioritize for a particular evaluation. That is, some speakers may be more commonly observed on a weekday as opposed to a weekend, and so, when a target profile is associated with a call made on a weekend, it can be beneficial to prioritize speaker profiles that are more commonly observed for weekend calls.

In particular implementations, endpoint information can be used to prioritize calls. For example, if an incoming call is associated with a particular endpoint address, the endpoint address may be associated with multiple users, and so may not be useable to accurately identify a number of discrete users of a shared telephone number. However, it can be more likely that a call being analyzed and associated with a particular endpoint address will be associated with an existing speaker profile, if one exists, that is also associated with that endpoint address.

In some cases, a speaker profile can include multiple sets of data, such as a discrete speaker profile information (generated using one of the techniques described above) from multiple calls determined to be associated with the speaker. This information can be used, as described, both in determining an order in which to evaluate speaker profiles, but also as part of the evaluation process itself. For example, when comparisons between audio for a speaker being analyzed and speaker profiles of the library are being made, if a given speaker is associated with multiple data sets, those data sets can be combined, and then the combination compared with the speaker profile for the audio being analyzed.

That is, a library can include clusters representing distinct speakers. Each cluster can have metadata and one or more speaker profiles containing information describing the speaker voice or voice patterns. In the case where vector-based comparisons are used, a vector for a speaker in the library can correspond to a vector generated based on combining vectors for the individual speaker profile data points (discrete calls associated with the speaker).

For each distinct speaker, a collection, or cluster, of speaker profiles is generated based on multiple calls associated with that speaker. These profiles encompass various voice characteristics extracted from different audio samples or calls, using the techniques described above, such as amplitude quantization, formant analysis, mel-frequency cepstral coefficients (MFCCs), linear predictive coding (LPC), and other spectral and temporal features.

To create a composite profile for a given speaker, the individual speaker profiles associated with that speaker are combined or fused into a unified representation. This fusion process captures the aggregate voice attributes exhibited by the speaker across multiple instances, which in some cases can provide more accurate comparison results.

The aggregation of individual speaker profiles can be performed using various fusion techniques tailored to the nature of the profile data. For instance, probability density function (PDF) fusion can be employed for techniques such as amplitude quantization, where PDFs are generated to represent voice characteristics. The individual PDFs derived from each call can be averaged or combined using weighted averaging to create a composite PDF, capturing the collective voice traits of the speaker across different calls.

Similarly, techniques like MFCCs and LPC yield feature vectors that encode spectral and temporal attributes of speech. These feature vectors from multiple calls can be concatenated or aggregated using statistical methods such as mean or weighted mean to form a composite feature vector representing the overall voice profile of the speaker.

Advanced fusion methods like kernel density estimation (KDE) can model the distribution of feature vectors or PDFs across multiple calls using non-parametric density estimation techniques. By estimating the joint density of voice features, KDE generates a composite density function that captures the multi-dimensional voice characteristics of the speaker. Another approach involves fitting Gaussian mixture models (GMMs) to the feature vectors or PDFs extracted from individual calls.

In other implementations, only a single speaker profile "instance" is maintained in a cluster, or multiple instances can be maintained, but only a single instance is used for comparison, rather than using a composite value. For example, a speaker profile instance may be selected that is the most recent, is based on the longest audio sample processes, or which has a lowest possible error associated with the data. In another example, a speaker profile instance for a speaker in the library can be selected based on contextual information.

Returning to the process 200, it is determined at 216 whether the target speaker profile generated from the audio received at 204 corresponds to a speaker profile in the library. This determination can be made by, for example, comparing a similarity score generated by the comparisons performed at 212 with a threshold value. If it is determined at 216 that the target speaker profile matches a profile in the library, the target speaker profile can be optionally added to the library at 220 (for example, storing the speaker profile instance in association with other speaker profile instances in a cluster for the speaker). The library can also be updated at 220, such as incrementing a number of times the speaker with the matching profile information was observed in a data set. The process 200 can then return to 204 when a new audio sample is received for processing.

If it is determined at 216 that the target speaker profile does not correspond to a speaker profile in the library, a new library entry/cluster can be added to the library as a new distinct speaker at 224. A number of discrete users observed can be incremented at 228.

As discussed, information regarding a number of discrete users of a telephone line can be used for a variety of purposes, such as management of computing/telephony resources. In the process 200, system resources are evaluated at 232, where the system resources can be those described in Example 3.

It is determined at 236 whether reconfiguration of the system should be performed based on the number of distinct users and the evaluation of the system resources at 232. As an example, different maximum numbers of distinct users can be associated with different resource settings, or additional resources can be allocated based on a threshold number of additional users being identified (for example, adding an amount of a resource for every five hundred distinct users). If reconfiguration is not indicated, the process 200 can return to 204.

If reconfiguration is indicated, the system can be reconfigured at 240, where the process 200 then returns to 204. Reconfiguration can include adjusting computing or telephony resource as discussed above, which can include traffic shaping. Traffic shaping can include forwarding calls intended for one phone line to another, along with metadata adjustment, as described above. Traffic shaping can also be performed as part of allocating additional resources, such as adjusting packet flows if additional networking resources are allocated.

As discussed, an advantage of disclosed techniques is that they can help maintain privacy/anonymity, since determining a distinct number of users does not require any particular speaker to be identified. However, if desired, a speaker profile can be associated with a speaker identity. The speaker identity can be used for a variety of purposes, including applying policies to a call or telephony services based on the speaker's identity.

In the context of the PBX system or other systems in which disclosed techniques are used, these policies can include various aspects of system management and security. Access control policies dictate who can access specific features or functionalities within the system, based on user roles, permissions, or authentication mechanisms.

Usage policies define guidelines for the use of the telephony system, including restrictions on call durations, destinations, or types of calls permitted. Security policies are put in place to ensure the confidentiality, integrity, and availability of communications, employing encryption protocols, firewall rules, or intrusion detection/prevention systems.

Compliance policies ensure that system usage adheres to relevant laws, regulations, or industry standards related to data privacy, telecommunications, or information security. Monitoring policies establish procedures for overseeing user activities within the system to detect unauthorized access, suspicious behavior, or compliance violations. Additionally, recording and retention policies delineate protocols for storing call recordings or communication data, including retention periods, access controls, and procedures for responding to legal or regulatory requests.

Example 5—Example Code Implementation

FIG. 3 provides python code 300 for a simple implementation of disclosed technologies. In the code 300, the librosa python library is used to load the audio file in the receive_audio method. The generate_speaker_profile method calculates a probability density function based on voice amplitude quantization using numpy.histogram of the numpy library.

The compare_profiles method uses the Kullback-Leibler divergence for comparison, calculated using scipy.stats.entropy of the scipy library.

The identify_users method ties these operations together: it receives audio, generates a speaker profile, checks if it matches any existing profiles, and if not, increments the number of distinct users and adds the new profile to the library.

Example 6—Example Operations

Figure 4:
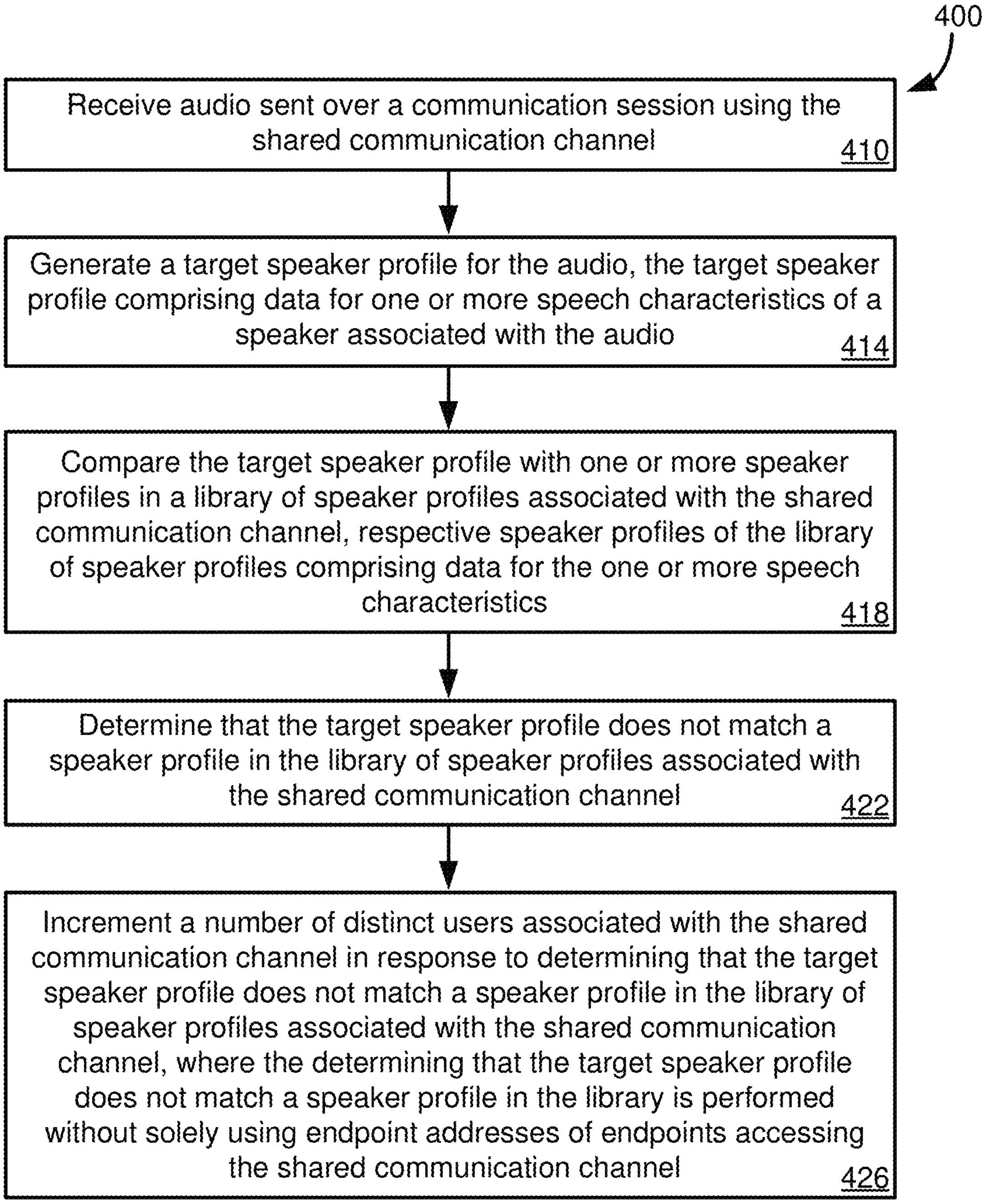
FIG. 4 is a flowchart of a process of identifying a number of discrete users of a shared communication channel based on audio captured from the shared communication channel over multiple communication sessions.

FIG. 4 illustrates a process 400 for identifying a number of discrete users of a shared communication channel based on audio captured from the shared communication channel over multiple communication sessions. At 410, audio is received over a communication session using the shared communication channel. A target speaker profile for the audio is generated at 414. The target speaker profile comprises data for one or more speech characteristics of a speaker associated with the audio.

At 418, the target speaker profile is compared with one or more speaker profiles in a library of speaker profiles associated with the shared communication channel. Respective speaker profiles of the library of speaker profiles comprise data for the one or more speech characteristics. It is determined at 422 that the target speaker profile does not match a speaker profile in the library of speaker profiles associated with the shared communication channel.

At 426, a number of distinct users associated with the shared communication channel is incremented in response to determining that the target speaker profile does not match a speaker profile in the library of speaker profiles associated with the shared communication channel. The determination at 422 is performed without solely using endpoint addresses of endpoints accessing the shared communication channel.

Example 7—Additional Examples

Example 1 is a computing system that includes at least one memory and at least one hardware processor coupled to the memory. The computing system also includes one or more computer-readable storage media storing computer-executable instructions. When executed, these instructions cause the computing system to perform operations to identify a number of discrete users of a shared communication channel based on audio captured from the shared communication channel over multiple communication sessions for multiple users of the shared communication channel. The shared communication channel has a communication channel identifier and is configured to support multiple concurrent communication sessions.

The operations include receiving audio sent over a communication session using the shared communication channel, generating a target speaker profile for the audio, comparing the target speaker profile with one or more speaker profiles in a library of speaker profiles associated with the shared communication channel, determining that the target speaker profile does not match a speaker profile in the library of speaker profiles associated with the shared communication channel, and incrementing a number of distinct users associated with the shared communication channel in response to determining that the target speaker profile does not match a speaker profile in the library of speaker profiles associated with the shared communication channel. T his determination is performed without solely using endpoint addresses of endpoints accessing the shared communication channel.

Example 2 is the computing system of Example 1, where a final determination of whether the target speaker profile matches a speaker profile in the library of speaker profiles is based solely on the one or more speech characteristics of the target speaker profile.

Example 3 is the computing system of Example 2, where the operations further include prioritizing the comparing of the target speaker profile with one or more speaker profiles in the library based at least in part on endpoint addresses accessing the shared communication channel.

Example 4 is the computing system of any Examples 1-3, where generating the target speaker profile for the audio includes generating a probability density function for quantized voice amplitude.

Example 5 is the computing system of Example 4, where comparing the target speaker profile with one or more speaker profiles in the library of speaker profiles includes determining the KL divergence between the target speaker profile and a probability density function for quantized voice amplitude of a speaker profile of the library of speaker profiles.

Example 6 is the computing system of any of Examples 1-5, where comparing the target speaker profile with one or more speaker profiles in the library of speaker profiles includes comparing the target speaker profile with multiple speaker profiles of the library of speaker profiles, and the comparing is performed according to an order.

Example 7 is the computing system of Example 6, where the order is based at least in part upon a respective number of times a call on the shared telephone line was attributed to a respective speaker profile of the library of speaker profiles.

Example 8 is the computing system of any of Examples 1-7, where speaker profiles of the library of speaker profiles do not identify an individual as a speaker associated with a given speaker profile of the library of speaker profiles.

Example 9 is the computing system of any of Examples 1-8, where the operations further include determining that the number of distinct users satisfies a threshold and, based on determining that the number of distinct users satisfies the threshold, increasing an amount of a resource of the shared communication channel.

Example 10 is the computing system of Example 9, where the shared communication channel is a shared telephone number and increasing an amount of a resource includes adding another shared telephone line to a shared-line telephony system comprising the shared telephone number and transferring at least a portion of calls to or from the shared telephone line to the another shared telephone line.

Example 11 is the computing system of Example 9 or Example 10, where the increasing an amount of a resource includes increasing an amount of network bandwidth available to the shared communication channel.

Example 12 is the computing system of any of Examples 9-11, where the shared communication channel is a shared telephone number and increasing an amount of a resource includes instantiating an additional private branch exchange server for a shared-line telephony system comprising the shared telephone number.

Example 13 is the computing system of any of Examples 1-11, where the shared communication channel is a shared telephone number, a shared network address, a shared radio frequency, a shared network link, or a shared network channel.

Example 14 is the computing system of any of Examples 1-13, where the shared communication channel is a shared telephone line and the communication channel identifier is a telephone number.

Example 15 is the computing system of any of Examples 1-11, where the shared communication channel is a virtual meeting platform and the communication channel identifier is a meeting ID or the shared communication channel is an online multiplayer game and the communication channel identifier is a game server address.

Example 16 is the computing system of any of Examples 1-15, where the shared communication channel is a radio communication system and the communication channel identifier is a radio frequency.

Example 17 is a method implemented in a computing system comprising at least one memory and at least one hardware processor coupled to the memory. The method performs operations to identify a number of discrete users of a shared communication channel based on audio captured from the shared communication channel over multiple communication sessions for multiple users of the shared communication channel. The shared communication channel has a communication channel identifier and is configured to support multiple concurrent communication sessions.

The operations include receiving audio sent over a communication session using the shared communication channel, generating a target speaker profile for the audio, comparing the target speaker profile with one or more speaker profiles in a library of speaker profiles associated with the shared communication channel, determining that the target speaker profile does not match a speaker profile in the library of speaker profiles associated with the shared communication channel, and incrementing a number of distinct users associated with the shared communication channel in response to determining that the target speaker profile does not match a speaker profile in the library of speaker profiles associated with the shared communication channel. This determination is performed without solely using endpoint addresses of endpoints accessing the shared communication channel.

Example 18 is the method of Example 17, where the shared communication channel is a shared telephone line and the communication channel identifier is a telephone number.

Example 19 is one or more computer-readable storage media that include computer-executable instructions. When executed by a computing system that includes at least one memory and at least one hardware processor coupled to the memory, these instructions cause the computing system to receive audio sent over a communication session using the shared communication channel, generate a target speaker profile for the audio, compare the target speaker profile with one or more speaker profiles in a library of speaker profiles associated with the shared communication channel, determine that the target speaker profile does not match a speaker profile in the library of speaker profiles associated with the shared communication channel, and increment a number of distinct users associated with the shared communication channel in response to determining that the target speaker profile does not match a speaker profile in the library of speaker profiles associated with the shared communication channel. This determination is performed without solely using endpoint addresses of endpoints accessing the shared communication channel.

Example 20 is the one or more computer-readable storage media of Example 19, where the shared communication channel is a shared telephone line and the communication channel identifier is a telephone number.

Example 8—Computing Systems

Figure 5:
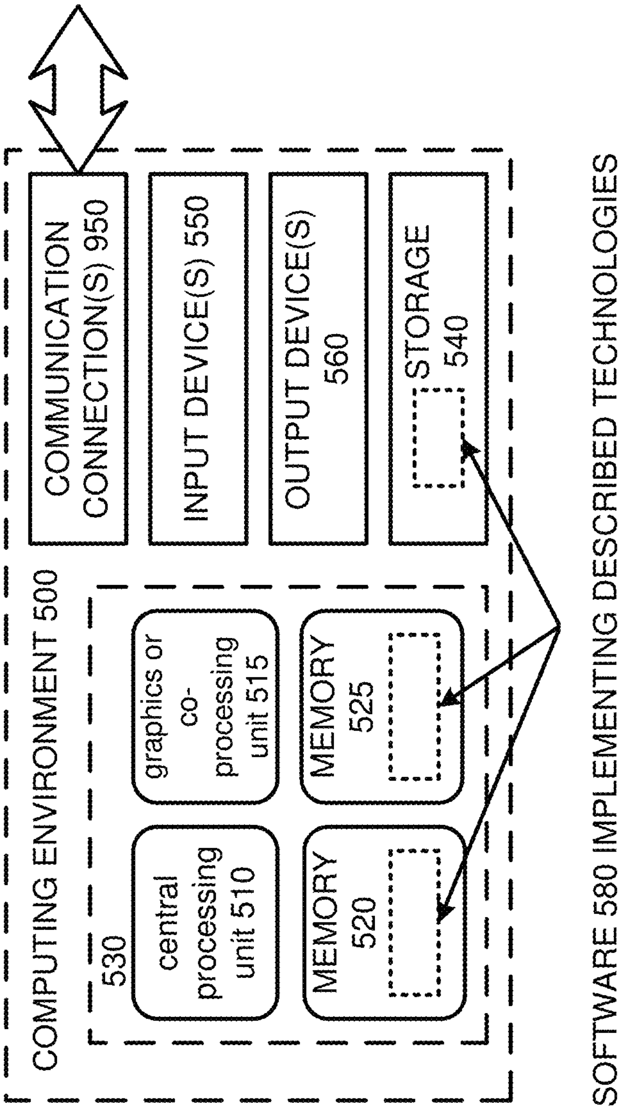
FIG. 5 is a diagram of an example computing system in which some described embodiments can be implemented.

FIG. 5 depicts a generalized example of a suitable computing system 500 in which the described innovations may be implemented. The computing system 500 is not intended to suggest any limitation as to scope of use or functionality of the present disclosure, as the innovations may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions, such as for implementing the features described in Examples 1-7. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, etc.), or some combination of the two, accessible by the processing unit(s) 510, 515. The memory 520, 525 stores software 580 implementing one or more innovations described herein, in the form of computer-executable instructions suitable for execution by the processing unit(s) 510, 515.

A computing system 500 may have additional features. For example, the computing system 500 includes storage 540, one or more input devices 550, one or more output devices 560, and one or more communication connections 550, including input devices, output devices, and communication connections for interacting with a user. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, CD-ROMs, DVDs, or any other medium which can be used to store information in a non-transitory way, and which can be accessed within the computing system 500. The storage 540 stores instructions for the software 580 implementing one or more innovations described herein.

The input device(s) 550 may be a touch input device such as a keyboard, mouse, pen, or trackball, a voice input device, a scanning device, or another device that provides input to the computing system 500. The output device(s) 560 may be a display, printer, speaker, CD-writer, or another device that provides output from the computing system 500.

The communication connection(s) 550 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9—Cloud Computing Environment

Figure 6:
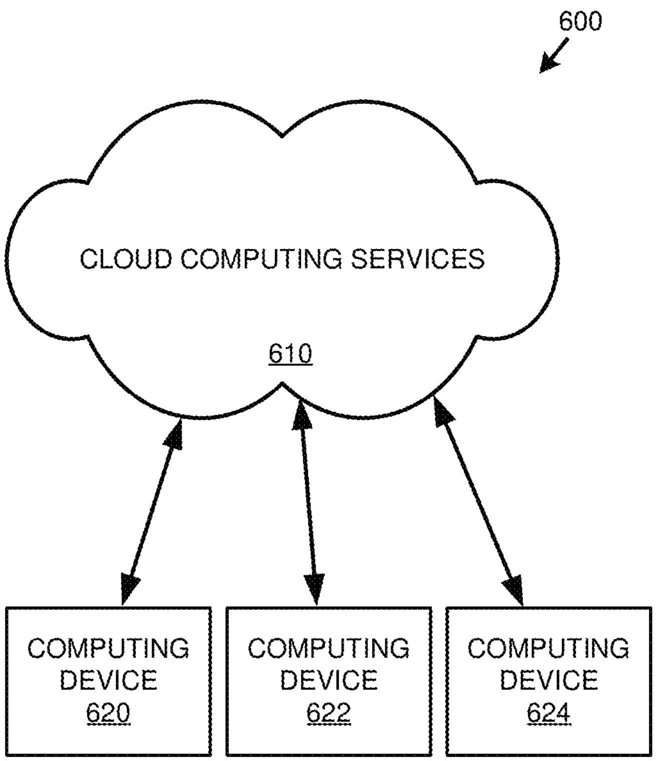
FIG. 6 is an example cloud computing environment that can be used in conjunction with the technologies described herein.

FIG. 6 depicts an example cloud computing environment 600 in which the described technologies can be implemented. The cloud computing environment 600 comprises cloud computing services 610. The cloud computing services 610 can comprise various types of cloud computing resources, such as computer servers, data storage repositories, networking resources, etc. The cloud computing services 610 can be centrally located (e.g., provided by a data center of a business or organization) or distributed (e.g., provided by various computing resources located at different locations, such as different data centers and/or located in different cities or countries).

The cloud computing services 610 are utilized by various types of computing devices (e.g., client computing devices), such as computing devices 620, 622, and 624. For example, the computing devices (e.g., 620, 622, and 624) can be computers (e.g., desktop or laptop computers), mobile devices (e.g., tablet computers or smart phones), or other types of computing devices. For example, the computing devices (e.g., 620, 622, and 624) can utilize the cloud computing services 610 to perform computing operations (e.g., data processing, data storage, and the like).

Example 10—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 5, computer-readable storage media include memory 520 and 525, and storage 540. The term computer-readable storage media does not include signals and carrier waves. In addition, the term computer-readable storage media does not include communication connections (e.g., 550).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:

at least one memory;

at least one hardware processor coupled to the at least one memory; and one or more computer readable storage media storing computer-executable instructions, that, when executed, cause the computing system to perform operations to identify a number of discrete users of a shared communication channel based on audio captured from the shared communication channel over multiple communication sessions for multiple users of the shared communication channel, the shared communication channel having a communication channel identifier, wherein the shared communication channel is configured to support multiple concurrent communication sessions, the operations comprising:

receiving audio sent over a communication session using the shared communication channel;

generating a target speaker profile for the audio, the target speaker profile comprising data for one or more speech characteristics of a speaker associated with the audio;

comparing the target speaker profile with one or more speaker profiles in a library of speaker profiles associated with the shared communication channel, respective speaker profiles of the library of speaker profiles comprising data for the one or more speech characteristics;

determining that the target speaker profile does not match a speaker profile in the library of speaker profiles associated with the shared communication channel, and incrementing a number of distinct users associated with the shared communication channel in response to determining that the target speaker profile does not match a speaker profile in the library of speaker profiles associated with the shared communication channel;

wherein the determining that the target speaker profile does not match a speaker profile in the library is performed without solely using endpoint addresses of endpoints accessing the shared communication channel.

2. The computing system of claim 1, wherein a final determination of whether the target speaker profile matches a speaker profile in the library of speaker profiles is based solely on the one or more speech characteristics of the target speaker profile.

3. The computing system of claim 2, the operations further comprising:

prioritizing the comparing the target speaker profile with one or more speaker profiles in the library based at least in part on endpoint addresses accessing the shared communication channel.

4. The computing system of claim 1, wherein generating the target speaker profile for the audio comprising generating a probability density function for quantized voice amplitude.

5. The computing system of claim 4, wherein comparing the target speaker profile with one or more speaker profiles in the library of speaker profiles comprises determining the KL divergence between the target speaker profile and a probability density function for quantized voice amplitude of a speaker profile of the library of speaker profiles.

6. The computing system of claim 1, wherein comparing the target speaker profile with one or more speaker profiles in the library of speaker profiles comprises comparing the target speaker profile with multiple speaker profiles of the library of speaker profiles, and the comparing is performed according to an order.

7. The computing system of claim 6, wherein the order is based at least in part upon a respective number of times a call on the shared telephone line was attributed to a respective speaker profile of the library of speaker profiles.

8. The computing system of claim 1, wherein speaker profiles of the library of speaker profiles do not identify an individual as a speaker associated with a given speaker profile of the library of speaker profiles.

9. The computing system of claim 1, the operations further comprising:

determining that the number of distinct users satisfies a threshold; and based on determining that the number of distinct users satisfies the threshold, increasing an amount of a resource of the shared communication channel.

10. The computing system of claim 9, wherein the shared communication channel is a shared telephone number and increasing an amount of a resource comprises adding another shared telephone line to a shared-line telephony system comprising the shared telephone number and transferring at least a portion of calls to or from the shared telephone line to the another shared telephone line.

11. The computing system of claim 9, wherein the increasing an amount of a resource comprises increasing an amount of network bandwidth available to the shared communication channel.

12. The computing system of claim 9, wherein the shared communication channel is a shared telephone number and increasing an amount of a resource comprises instantiating an additional private branch exchange server for a shared-line telephony system comprising the shared telephone number.

13. The computing system of claim 1, wherein the shared communication channel is a shared telephone number, a shared network address, a shared radio frequency, a shared network link, or a shared network channel.

14. The computing system of claim 1, wherein the shared communication channel is a shared telephone line and the communication channel identifier is a telephone number.

15. The computing system of claim 1, wherein the shared communication channel is a virtual meeting platform and the communication channel identifier is a meeting ID or the shared communication channel is an online multiplayer game and the communication channel identifier is a game server address.

16. The computing system of claim 1, wherein the shared communication channel is a radio communication system and the communication channel identifier is a radio frequency.

17. A method, implemented in a computing system comprising at least one memory and at least one hardware processor coupled to the at least one memory, to perform operations to identify a number of discrete users of a shared communication channel based on audio captured from the shared communication channel over multiple communication sessions for multiple users of the shared communication channel, the shared communication channel having a communication channel identifier, wherein the shared communication channel is configured to support multiple concurrent communication sessions, the method comprising:

receiving audio sent over a communication session using the shared communication channel;

generating a target speaker profile for the audio, the target speaker profile comprising data for one or more speech characteristics of a speaker associated with the audio;

comparing the target speaker profile with one or more speaker profiles in a library of speaker profiles associated with the shared communication channel, respective speaker profiles of the library of speaker profiles comprising data for the one or more speech characteristics;

determining that the target speaker profile does not match a speaker profile in the library of speaker profiles associated with the shared communication channel, and incrementing a number of distinct users associated with the shared communication channel in response to determining that the target speaker profile does not match a speaker profile in the library of speaker profiles associated with the shared communication channel;

wherein the determining that the target speaker profile does not match a speaker profile in the library is performed without solely using endpoint addresses of endpoints accessing the shared communication channel.

18. The method of claim 17, wherein the shared communication channel is a shared telephone line and the communication channel identifier is a telephone number.

19. One or more computer-readable storage media comprising:

computer-executable instructions that, when executed by a computing system comprising at least one memory and at least one hardware processor coupled to the at least one memory, cause the computing system to receive audio sent over a communication session using the shared communication channel;

computer-executable instructions that, when executed by the computing system, cause the computing system to generate a target speaker profile for the audio, the target speaker profile comprising data for one or more speech characteristics of a speaker associated with the audio;

computer-executable instructions that, when executed by the computing system, cause the computing system to compare the target speaker profile with one or more speaker profiles in a library of speaker profiles associated with the shared communication channel, respective speaker profiles of the library of speaker profiles comprising data for the one or more speech characteristics;

computer-executable instructions that, when executed by the computing system, cause the computing system to determine that the target speaker profile does not match a speaker profile in the library of speaker profiles associated with the shared communication channel, and computer-executable instructions that, when executed by the computing system, cause the computing system to increment a number of distinct users associated with the shared communication channel in response to determine that the target speaker profile does not match a speaker profile in the library of speaker profiles associated with the shared communication channel;

computer-executable instructions that, when executed by the computing system, cause the computing system to determine that the target speaker profile does not match a speaker profile in the library is performed without solely using endpoint addresses of endpoints accessing the shared communication channel.

20. The one or more computer-readable storage media of claim 19, wherein the shared communication channel is a shared telephone line and the communication channel identifier is a telephone number.

* * * * *